Sept. 8, 1936.  R. BISHOP  2,053,597

MACHINE FOR GENERATING CAMS OF THE WORM TYPE

Filed June 3, 1935   7 Sheets-Sheet 1

Inventor,
Reginald Bishop
Per, C. Yge Fraser
Atty.

Sept. 8, 1936.　　　　R. BISHOP　　　　2,053,597
MACHINE FOR GENERATING CAMS OF THE WORM TYPE
Filed June 3, 1935　　　7 Sheets-Sheet 3

Inventor,
Reginald Bishop
Per, C. Use Sear
Atty.

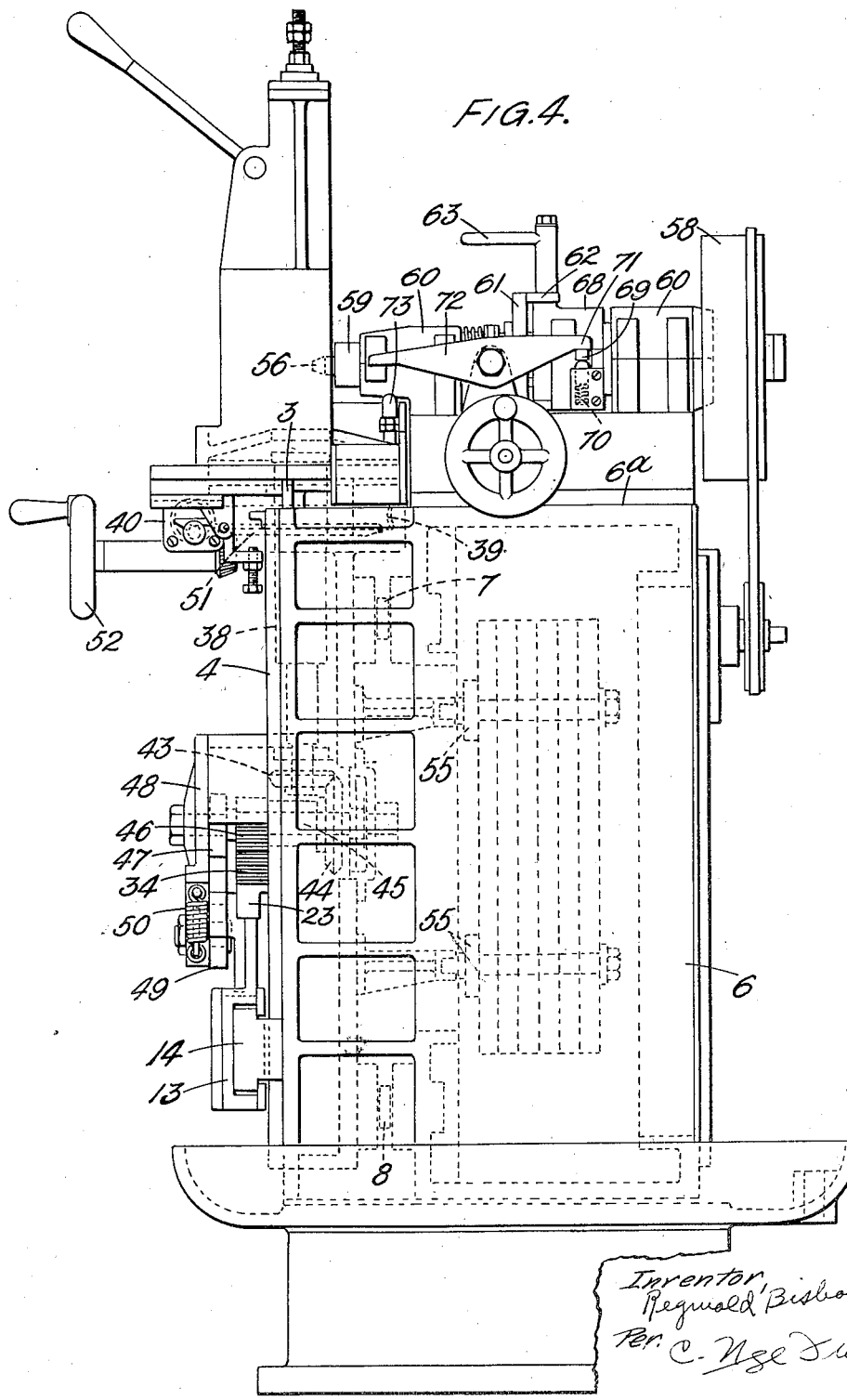

Sept. 8, 1936.  R. BISHOP  2,053,597
MACHINE FOR GENERATING CAMS OF THE WORM TYPE
Filed June 3, 1935  7 Sheets-Sheet 5
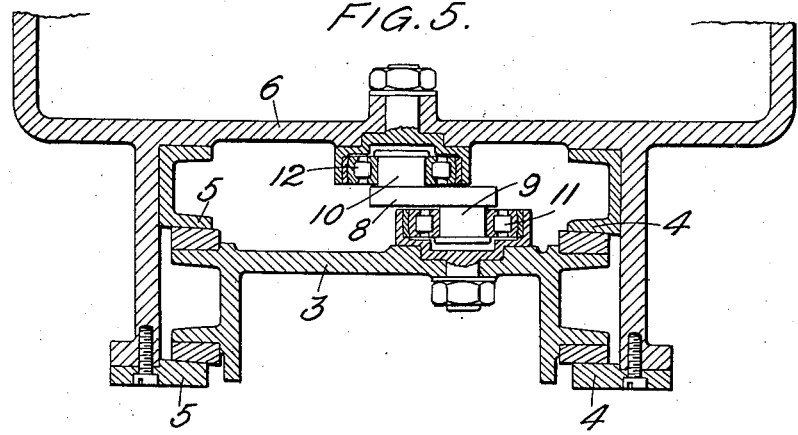
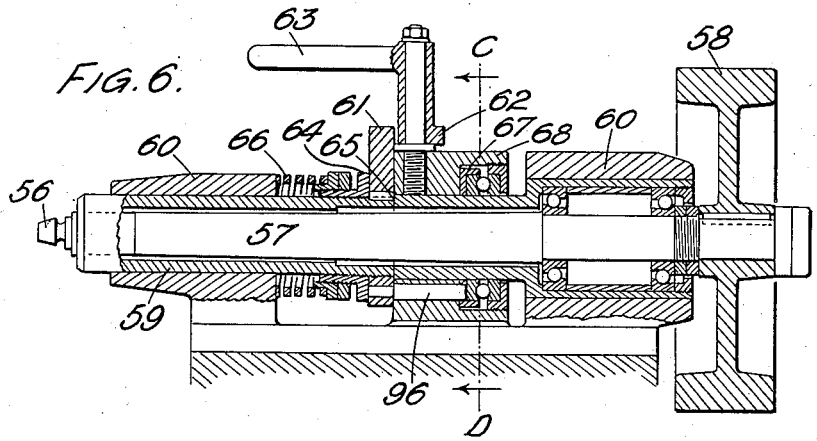
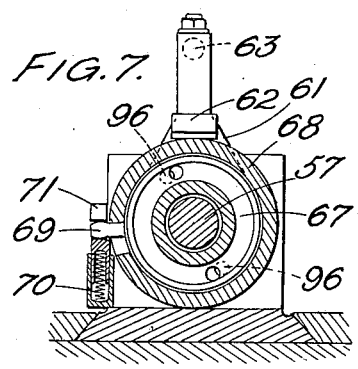

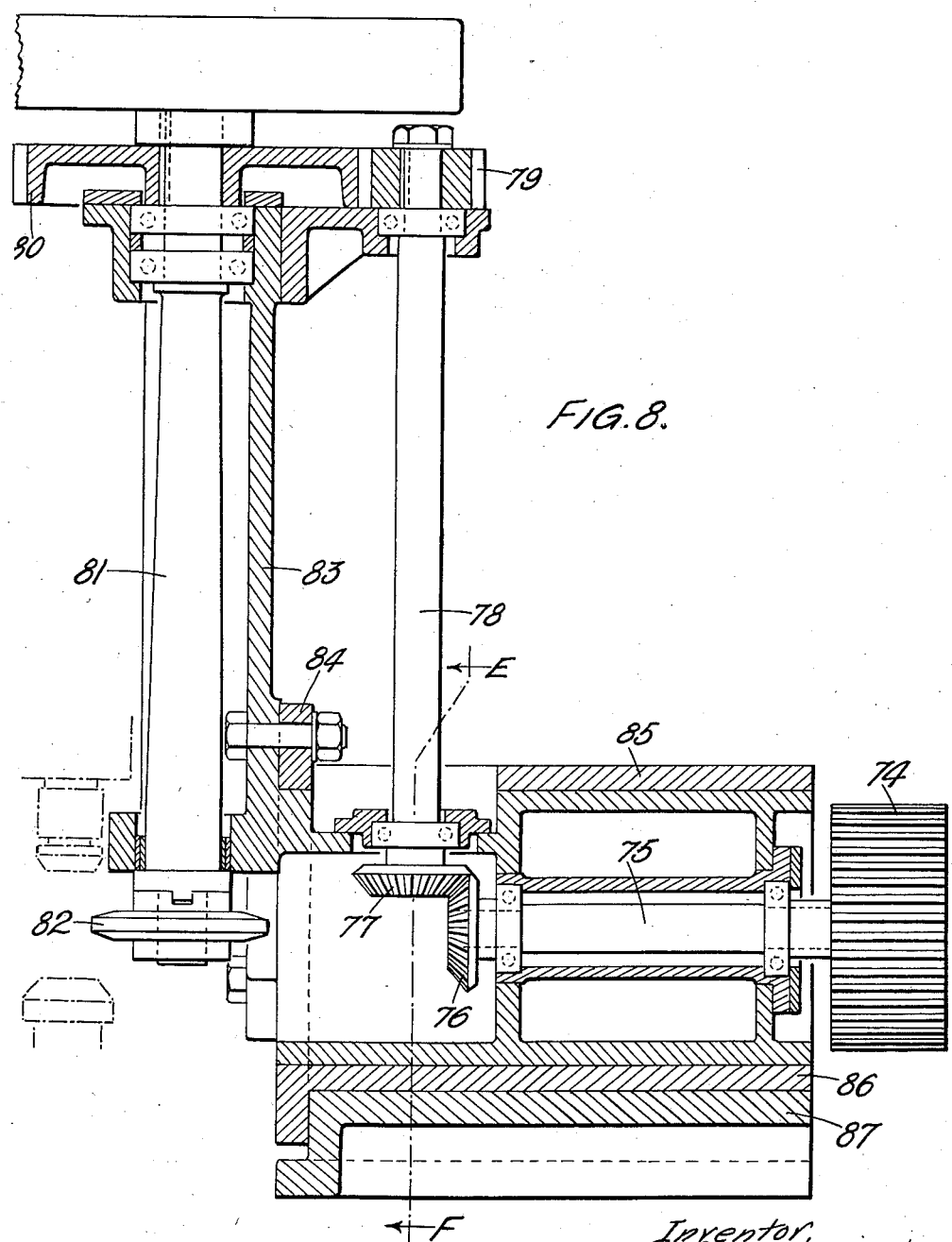

Sept. 8, 1936.  R. BISHOP  2,053,597
MACHINE FOR GENERATING CAMS OF THE WORM TYPE
Filed June 3, 1935  7 Sheets-Sheet 7

Inventor,
Reginald Bishop
Per, C. Yge Fraser
Atty.

Patented Sept. 8, 1936

2,053,597

UNITED STATES PATENT OFFICE 2,053,597

MACHINE FOR GENERATING CAMS OF THE WORM TYPE

Reginald Bishop, Golders Green, London, England

Application June 3, 1935, Serial No. 24,749
In Great Britain March 13, 1934

19 Claims. (Cl. 90—13.7)

The present invention concerns improvements in or relating to machines for generating cams of the worm type.

In the manufacture of certain cams of the worm type for use in steering gear of mechanically propelled vehicles, which cams are not truly helical, it has been found difficult to obtain a cam groove of the exact shape required, and somewhat expensive expedients have had to be resorted to in order to obtain the desired results. The main object of the present invention is to provide a machine by means of which such cams may be manufactured more readily and cheaply than heretofore; also to eliminate backlash and lost motion between the generating surfaces and the work.

The machine according to the present invention for generating cams of the worm type is of the kind having a worm-blank carrier, a control member to move it bodily in a manner to cause generation of the cam and driving means to rotate the carrier and to move the control member.

It has been proposed in such a machine to mount the control member on a slide on the worm-blank carrier which in turn is mounted by link gears to move in the parallel ruler motion, and to connect the latter to the control member by means of a rack operatively connected to the link gears whereby the worm-blank carrier is moved in a parallel ruler motion by the driving of said link gears and carries with it the control member.

The present invention has for object to provide a machine of the kind described in which the number of gear connections and the consequent source of error are reduced. For this purpose according to the present invention the worm-blank carrier is in direct operative connection with the control member and the latter is carried or guided directly upon a fixed part of the machine.

Machines according to the present invention will now be described by way of example and with reference to the accompanying drawings wherein:—

Fig. 4 is a side elevation thereof;

Fig. 5 is a section on the line A—B of Fig. 3 to a larger scale;

Fig. 6 is a sectional side elevation; and

Fig. 7 is a section on the line C—D thereof of details;

Fig. 8 is a sectional side view of a rough cutting tool apparatus, and

Like references refer to like parts throughout the drawings.

Figure 1:
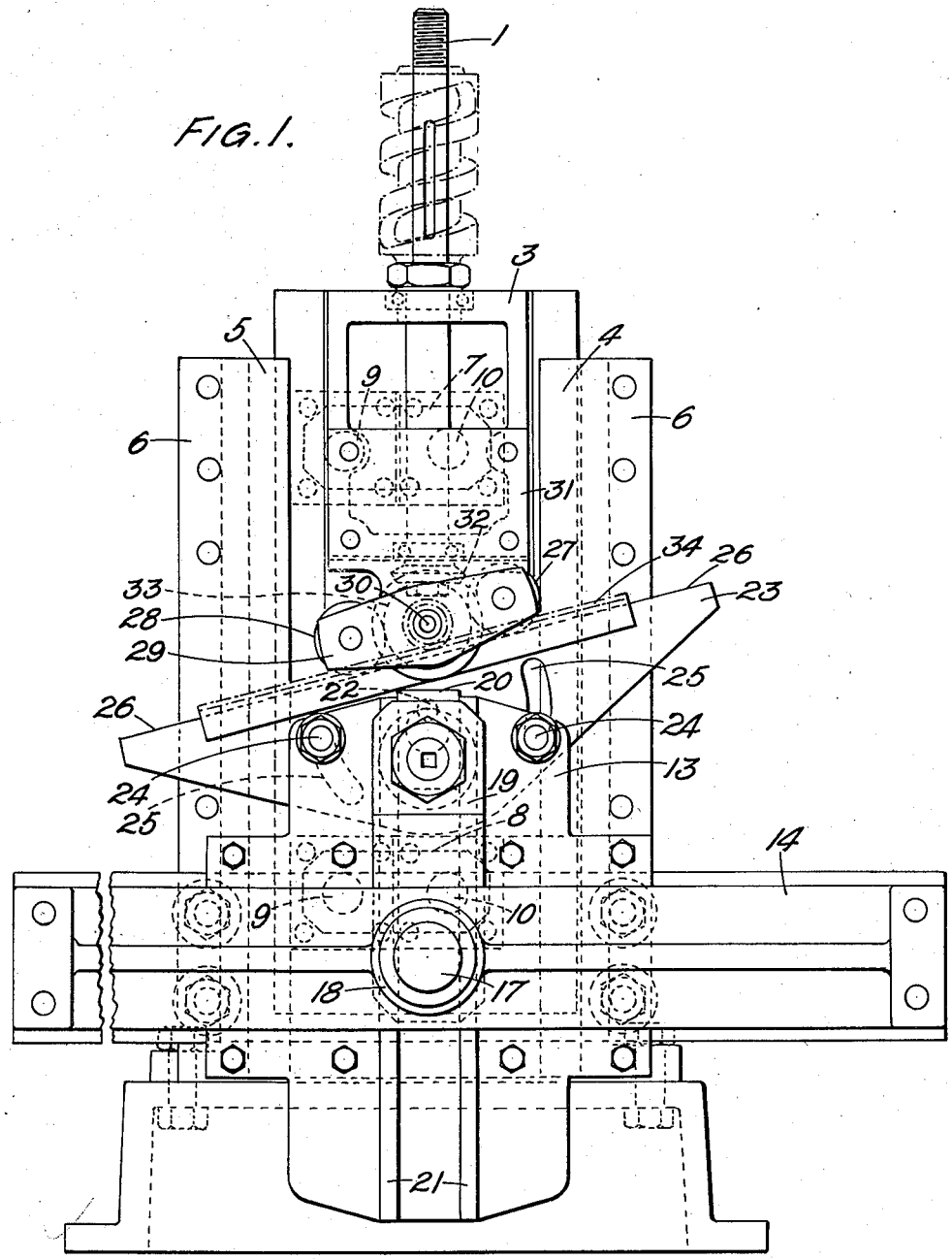
Fig. 1 is a front elevation of one form of machine for producing a cam by means of a grinding tool from a roughly cut cam.
Figure 2:
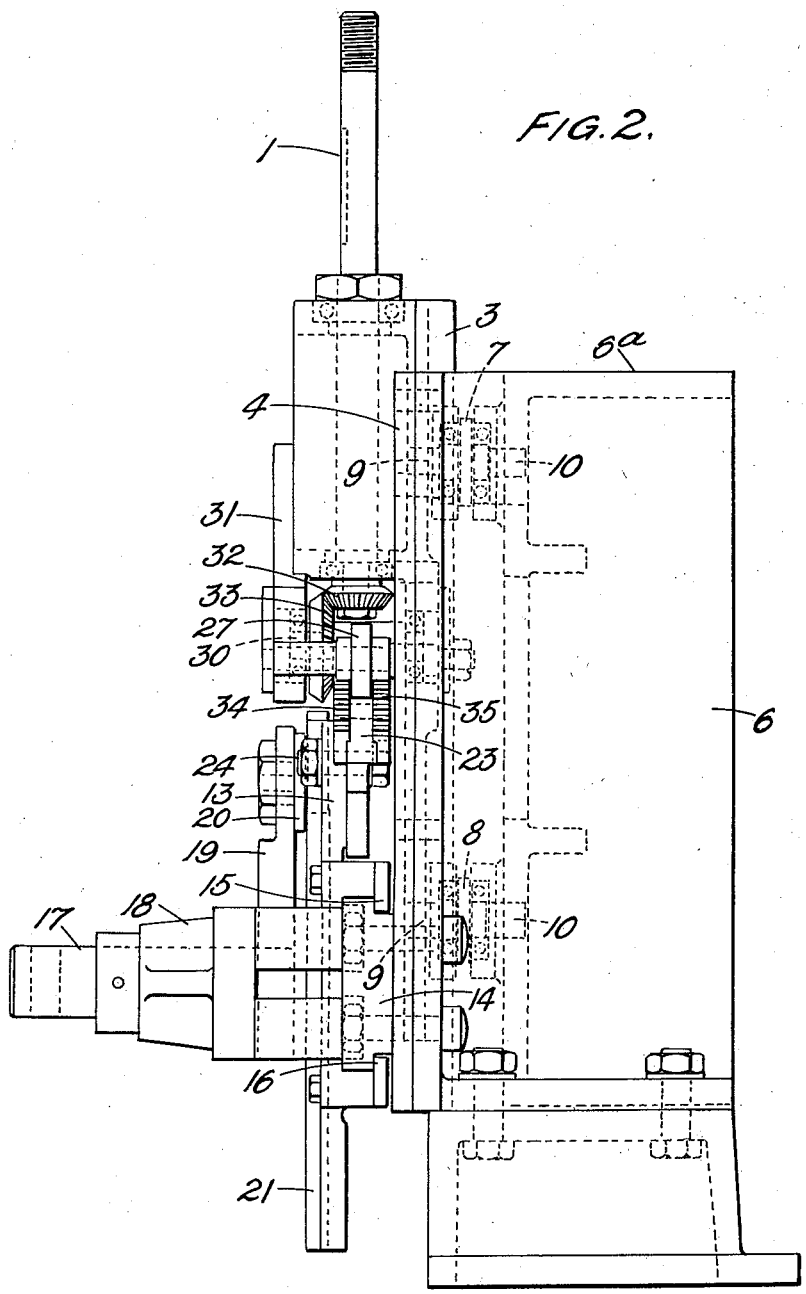
Fig. 2 is a side elevation thereof.

Referring to Figs. 1 and 2 the machine is intended to grind a cam from a roughly cut blank to its accurate finished size, the grinding tool being fixed in position and the cam blank being moved during the grinding operation both axially and at the same time in a parallel ruler motion.

The roughly cut cam blank, indicated in chain lines in Fig. 1, is mounted on a vertical spindle 1 and the grinding tool together with means for feeding it in the usual manner is carried on slide means mounted on a bed at 6a on the frame 6. The vertical spindle 1 is carried for rotation in a slide 3 which is movable in a vertical plane in guideways 4, 5 on the machine frame 6. The guideways are wider than the slide 3 so as to permit the slide to move laterally during its vertical movement. It is connected at the rear to the frame 6 to have a parallel ruler motion in relation thereto, as for example by a pair of radius arms 7 and 8. These arms are horizontal when the slide 3 is at the middle of its up-and-down movement and in the construction illustrated they move through an angle of about 40° to each side of their horizontal position.

The arrangement is such that when the slide 3 is in its uppermost or lowermost position it is also as far to the left as it is permitted to go and when in its mid position it is as far to the right as it is permitted to go.

The up-and-down movement of the slide is obtained as follows. At the lower part of the machine there is a horizontal traveller 13 which travels on a horizontal guideway 14, the traveller having parts 15, 16 which extend over the back of the guideway 14 as illustrated in Fig. 2. A rotary shaft 17 mounted in a bearing in a bracket 18 carried on the frame-work of the machine is connected by a crank arm 19 to a sliding block 20 which moves in a vertical guideway 21 in the traveller 13 constituting a cross-head connection. Thus as the shaft 17 is rotated the traveller 13 is moved from side-to-side, the sliding block 20 moving up-and-down in its guideway 21. A control member 23 is pivoted at 22 to the upper portion of the traveller 13; said control member has clamping means constituted by bolts 24 and slots 25 so that it can be clamped to the traveller with its upper (control) surface, which is a plane surface 26, at an angle (for example 30°) to the horizontal as may be required. Resting on the plane control surface of the control member are two rollers 27, 28 mounted on opposite ends of a rocker 29 which is centrally pivoted at 30 to the lower end of a bracket 31 which is attached to the vertical slide 3. In consequence of this construction when the horizontal traveller 13 is reciprocated backwards and forwards the canted control member 23 will move laterally underneath the rollers 27, 28 and through them will move the vertical slide 3 up and down. It is to be observed that during this up and down movement of the vertical slide it has also lateral movement the amount of which will be determined by the amount of up and down movement and by the length of the radius arms 7, 8 connecting the vertical slide to the frame of the machine. Consequently the spindle carrying the cam blank will be moved up and down and laterally. The spindle 1 is also rotated for which purpose the following mechanism is provided. The lower end of the spindle has fixed to it a bevel gear 32 which meshes with a bevel wheel 33 fixed on the spindle 30. Said spindle has fixed to it a pair of pinions which mesh with two racks 34, 35 one on each side of the control member and which, preferably, do not have their teeth exactly in line with one another so as to eliminate backlash. In some constructions a single rack may be employed. In consequence of this arrangement as the control member 23 is reciprocated laterally in a straight line to raise and lower the vertical slide 1, the lateral movement will at the same time produce rotation of the blank-carrying spindle 1. The proportions of the parts and amount of the reciprocation of the control member will be such that the spindle is given the exact amount of rotation necessary for generating the complete cam worm before reverse movement commences.

By means of this machine a cam of the correct shape may be generated by a control member 23 having a straight plane surface instead of requiring a surface corresponding in shape to the surface to be generated. By eliminating the radius arm connection of the vertical slide and causing that slide to move vertically without lateral movement the machine can be adapted to form a cam thread of true helical form. Thus the machine is capable of forming a cam worm either of true helical form or of other form as may be desired.

In place of the pinion-and-rack drive for the spindle the latter may be rotated by steel bands connected to a rotary member and to the control member in a manner which will be apparent to engineers.

The control member has been referred to as having a plane surface. The upper face of the control member may however be other than flat; it may be of arcuate formation to give faster or slower pitch to the work as desired but even so there is not required a complicated guide surface comparable with the surface to be generated.

The machine has been described as for finishing a cam by means of a grinding tool and in the grinding operation the speed of working is 30 ft. to 40 ft. per minute on the ground surface.

To produce a rough cut, for example by means of a milling cutter, the speed of operation is much less, only, for example about 3 ins. per minutes. In view of this difference and for more rigid control of the work to hold it against the action of the cutting tool it is preferred, when the machine is being used as a milling machine, not to drive the spindle from the control member as previously described.

Figure 3:
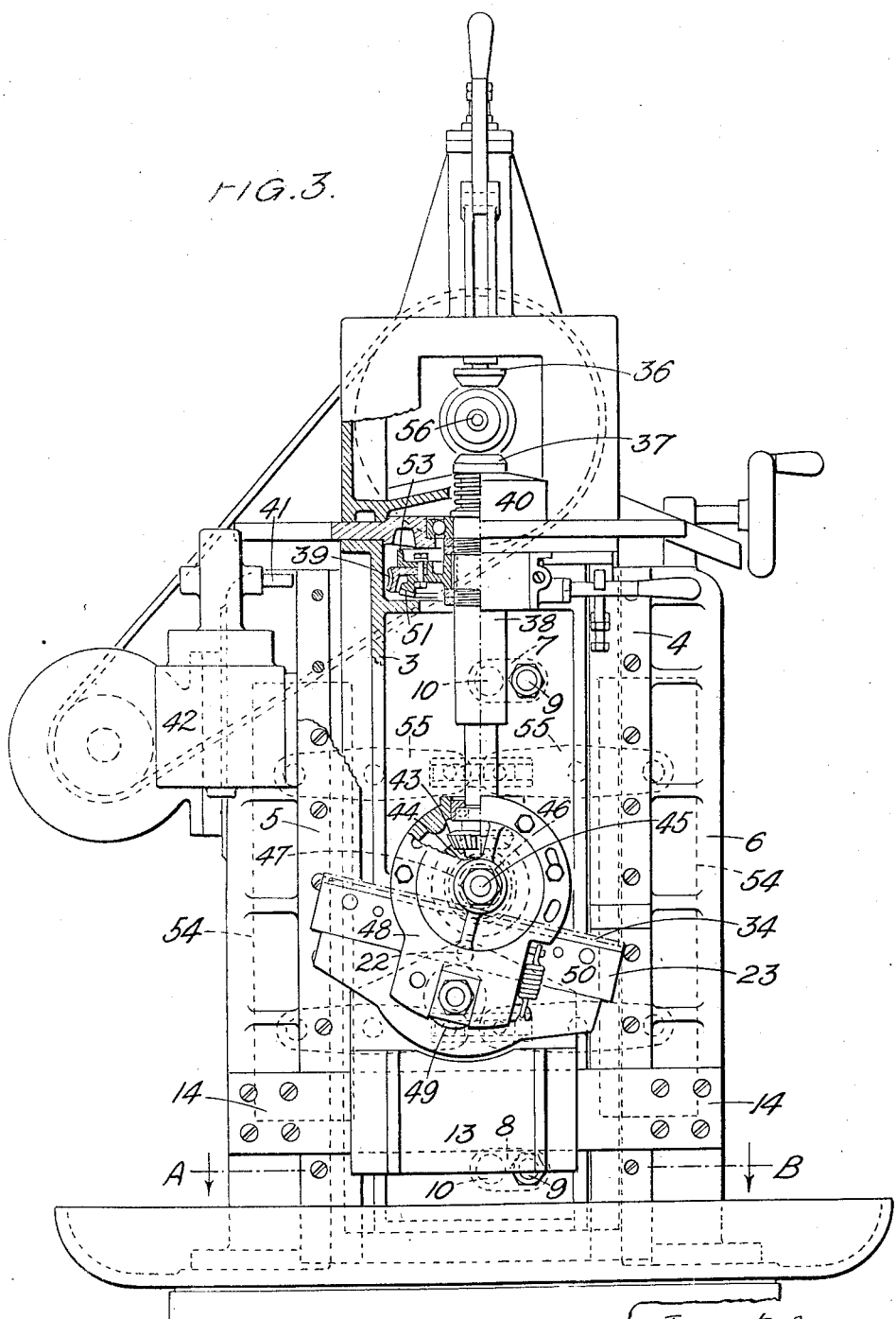
Fig. 3 is a front elevation of a modified form of machine for an initial cutting operation.

A modified form of machine for effecting a rough cut by a milling operation will now be described with reference to Figs. 3 and 4.

In this case the slide 3 moves in the guides 4, 5 in the frame 6 and carries at its upper end rotatable work holding means 36, 37. The lower part of the work holding means 37 is carried on a vertical spindle 38 mounted in bearings on the slide 3.

The spindle 38 has keyed to it a worm wheel 39 which meshes with a worm contained in a box 40 and carried on a shaft which is connected by a coupling to a shaft 41 driven by an electric motor 42 mounted on a plate fixed on the slide 3 so that the motor moves with said slide 3. The spindle 38, at its lower end, has a bevel wheel 43 which meshes with a bevel wheel 44 fixed on a shaft 45 which also has fixed to it a rack pinion 46 and freely mounted on it a roller 47. The rack pinion co-operates with the rack 34 on the upper surface of the control member 23 which is pivotally mounted at 22 on the horizontal traveller 13. The horizontal traveller moves on the guide-bar 14, mounted on the frame.

The shaft 45 is carried at one end on a carrier plate 48 the other end being supported on the slide. Said plate carries at its lower end another spindle on which is freely mounted a further roller 49 which engages the underside of the control member 23. The roller 49 may be mounted on an arm pivoted at one end to the carrier plate 48 and attached at the other end to said carrier plate by a spring 50 so that the rollers 47 and 49 are held firmly up against the upper and under sides of the control member 23. The spring may be replaced by a positive fixing such as a bolt. 7, 8 are the links pivoted to the frame 6 at 10 and to the slide 3 at 9. In the arrangement described above it will be noted that the mechanism is driven from the spindle 38 which carries the one end 37 of the rotatable work holding means.

The arrangement of the radius arms is illustrated more fully in Fig. 5. The opposite faces of the guides, 4, 4, and 5, 5, are parallel and are at such an angle that the slide 3 moves the cam blank at each end of its up-and-down movement more towards the fixed milling tool than at the middle of said movement. The radius arms carry at their ends pins 9, 10, respectively, each of which is mounted in a self-aligning roller bearing 11, 12 respectively, the housings of which are carried respectively, the one in the main frame 6 and the other in the slide 3. The arrangement is such that when the slide 3 is in its uppermost position it is as far to the left as it is permitted to go and is also as far towards the fixed cutter as it can go; when it is in mid vertical position it is as far to the right as it is permitted to go and at a maximum distance from the fixed cutter; when it is in the lowermost position it is again as far to the left as it is permitted to go and as far towards the fixed cutter as it is permitted to be. This arrangement may, of course, be provided in the form of the machine illustrated in Figs. 1 and 2.

54 are weights carried at the one ends of levers 55 connected at their other ends to the slide 3 to counterbalance the weight of the slide and work.

Since the spindle is driven slowly through the worm gear the apparatus is particularly suitable for a milling operation to produce a rough cut. The arrangement illustrated in Figs. 3 and 4 may be provided with other than a worm gear drive and may then be employed for a grinding or other operation.

As a worm gear is employed to drive the machine a hand operated bevel gear 51 operated from a handle wheel 52 may be employed to give a quick return motion the worm being disconnected from the worm-wheel during its operation. 53 is a friction drum against which a friction pad bears for the purpose of damping out chatter.

It is particularly desirable when the tool by which the cam groove is cut or finished reaches the end of the cam groove, it shall be withdrawn therefrom to prevent the production of a cavity in the end of the groove. Mechanism to effect this withdrawal is illustrated in Figs. 6 and 7. The cutting apparatus is mounted on the bed 6a on the frame 6. The cutter 56 is mounted at the end of a spindle 57 driven from a pulley 58 and which rotates within a quill 59. The quill slides in bearings 60 and has keyed to it a plate 61 which extends outwardly and is operated upon on one side by a cam 62, which is movable by a handle 63. On the other side of the plate 61 a collar 64 screwed on the quill holds the plate 61 up against a shoulder 65 on the quill. A spring 66 acts between the bearing 60 and the collar 64 and the plate 61 carries two pins 96. (See Fig. 7.) These pins are adapted to enter holes in a trip plate 67 mounted in a fixed housing 68. The trip plate 67 has an outwardly projecting arm 69 (Fig. 7) which, on the underside, is operated on by a spring 70 and on the upper side by the end 71 of a lever 72 whose opposite end is disposed in the path of a member 73 carried on the slide 3.

The apparatus is so adjusted that at the end of the travel of the cutter 56 in the cam groove the member 73 engages the lever 72 and moves it and consequently the arm 69 against the spring 70 whereby the trip plate 67 is rotated to cause its holes to register with the pins 96. The pins can thereby enter the holes in the trip plate as shown in Fig. 7, so that the plate 61 and with it the quill 59 is permitted to move to the right and withdraw the cutter 56 from the cam groove. At the commencement of operations the handle 63 is operated so that the cam 62 moves the plate 61 and with it the quill 59 and the cutter 56, at the same time compressing the spring 66 and withdrawing the pins 96 from the holes in the trip plate 67. The spring 70 then moves the trip plate 67 to hold the pins so that the cutter 56 is maintained in its working position (see Fig. 7).

Figure 9:
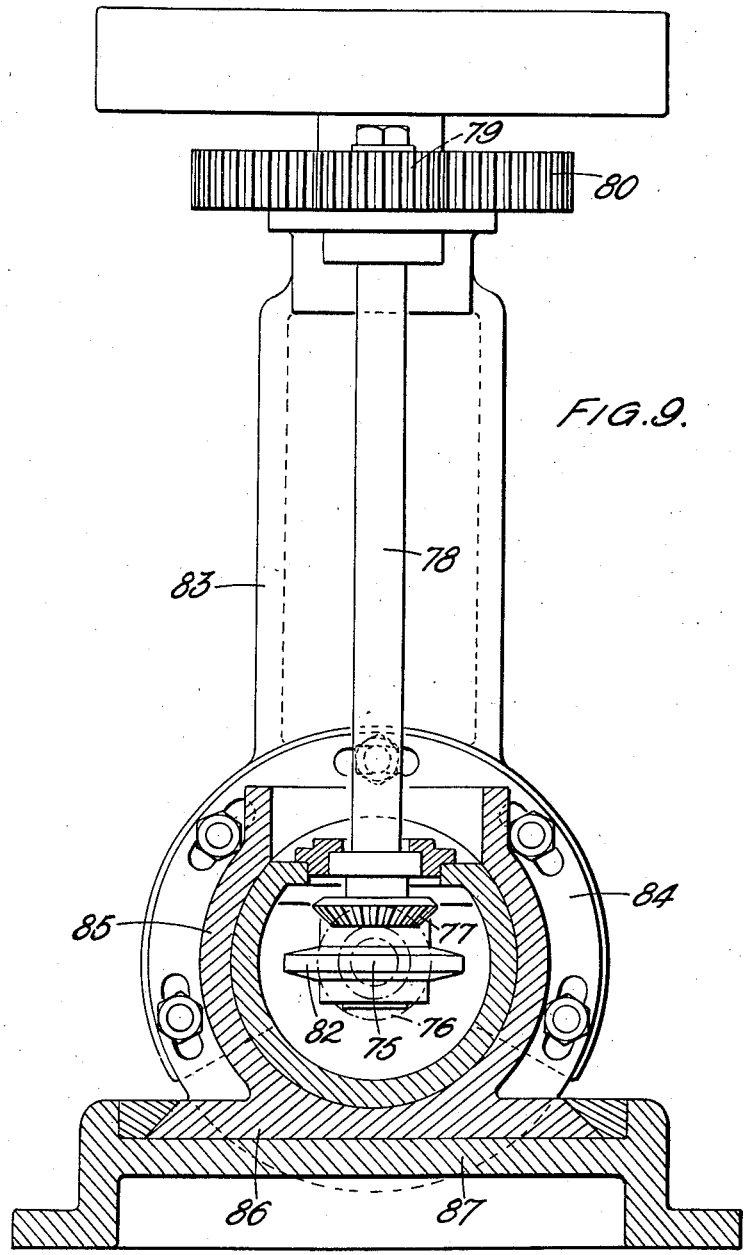
Fig. 9 is a part section thereof on the line E—F.

Cutting tool apparatus for effecting a cut in the production of the cam is illustrated in Figs. 8 and 9. The drive is from a pinion 74 on a shaft 75 through bevel wheels 76 and 77 to a vertical shaft 78 which drives through pinions 79, 80, a second vertical shaft 81 extending downwardly and carrying at its end the tool 82. The bearings for the vertical shaft 81 are carried on a frame 83 which is rotatable about the axis of the shaft 75 and is fixed in position by being clamped to a plate 84 on the end of a circular housing 85 of the shaft 75.

The apparatus just described is carried on a slide 86 on a bed 87 which is removably attached to the frame 6 of the machine.

The arrangement is such that the angle of the cutter 82 in relation to the work can be varied by varying the position at which the frame-work 83 is clamped to the plate 84.

The cutting apparatus illustrated in Figs. 6 and 7 may be readily exchanged for that illustrated in Figs. 8 and 9.

It will be observed that the form of machine described has the advantages that a cam can be generated easily from a plane surface in contradistinction to a surface corresponding in shape to the surface to be generated; and also that for practical purposes backlash or lost motion is eliminated without the necessity for the use of springs.

In the apparatus illustrated above the opposite ends of the guides, 4, 4, and 5, 5, are parallel but straight. It will be understood that they may be other than straight whereby a composite movement of the slide 3 can be obtained to vary the form of the cam as desired by varying the depth of the cam groove at different parts.

What I claim is:—

1. In a machine for generating a cam of the worm-type in combination with a carrier for a cam-blank, means to rotate the carrier, and means to control the generation of the cam, the said control means being carried upon a fixed part of the machine and having an inclined plane control surface operative upon the carrier to move it bodily at the same time as it is rotated.

2. In a machine for generating a cam of the worm-type in combination with a carrier for a cam-blank, means to rotate the carrier, means to control the generation of the cam, the said control means being carried upon a fixed part of the machine and having an inclined control surface operative upon the carrier to move it bodily at the same time as it is rotated, and means for adjusting the angle of inclination of the control surface.

3. In a machine for generating a cam of the worm-type in combination with a carrier for a cam-blank, means to rotate the carrier, cam-generation control means operative upon the carrier to move it bodily at the same time as it is rotated, guilding means for the carrier adapted for endowing the bodily movement thereof with components transverse one to the other, a straight guide carried upon a fixed part of the machine and means for moving the control means in a straight line on the said guide.

4. A machine for generating a cam of the worm-type comprising in combination a slide, a worm-blank carrier mounted for rotation thereon, a control member having an inclined plane control surface, a guide for the control member carried upon a fixed part of the machine and extending transversely of the axis of rotation of the worm-blank carrier, means for moving the control member along the said guide, a direct operative connection between the control member and the slide and a direct gear connection between the control member and the worm-blank carrier, said connections being such as to cause the slide to be moved axially and the worm-blank carrier to be rotated when the control member is moved transversely.

5. In a machine for generating a cam of the worm-type in combination with a slide, a cam-blank carrier rotatable thereon, a cam-generation control member operative upon the slide to move the same substantially in the direction of the axis of the carrier, a rack on the control member, a pinion meshing with the rack and operatively connected to the cam-blank carrier, and means for traversing the control member and rack in relation to the slide and pinion.

6. In a machine for generating a cam of the worm-type in combination with a rotatable cam-blank carrier, a cam-generation control member operative upon the carrier to move the same substantially axially, two racks upon the control member, pinions meshing with the racks and operatively connected with the cam-blank carrier, and means for traversing the control member and racks in relation to the cam-blank carrier and pinions, the teeth of the two racks being out of alignment with each other in order to eliminate backlash.

7. In a machine for generating a cam of the worm-type in combination with a slide, a cam-blank carrier rotatable thereon, an angularly inclined cam-generation control member operative upon the slide to move the same substantially in the axial direction of the cam-blank carrier, means for adjusting the angle of inclination of the said control-member, a rack on the control member, a pinion meshing with the rack and operatively connected to the cam-blank carrier, and means for traversing the control member and rack in relation to the slide and pinion.

8. In a machine for generating a cam of the worm-type, in combination with a slide, a cam-blank carrier rotatably mounted on the slide, rollers mounted on the slide, and a cam-generation control member having two parallel surfaces on opposite sides, engaging respectively with the rollers, for imparting movement to the slide substantially in the direction of the axis of the carrier one of the said rollers being movable towards the respective surface of the said control member for maintaining engagement therewith.

9. In a machine for generating a cam of the worm-type, in combination with a slide, guiding means for the slide permitting the same to perform a substantially vertical movement, a cam-blank carrier rotatably mounted in the slide with its axis vertical, an inclined cam-generation control member upon which the slide rests, a fixed horizontal guide for the said member, and means for traversing the said member from side to side on the guide to impart vertical motion to the slide.

10. In a machine for generating a cam of the worm-type, in combination with a rotatable cam-blank carrier, a slide in which the carrier is mounted, a cam-generation control member in operative engagement with the slide and adapted for imparting movement thereto substantially in the direction of the axis of the carrier, and means for moving the control member from side to side at right angles to the said axis, consisting of a driving shaft and a crosshead device operatively connecting the driving shaft to the control member.

11. In a machine for generating a cam of the worm-type, in combination with a cam-blank carrier, means for rotating the carrier, guide means permitting the said carrier a bodily movement substantially in the direction of the axis of rotation thereof, a control member having a cam-generation control surface operatively engaging the carrier, a guide for the said control member carried upon a fixed part of the machine, and actuating means for moving the control member in the guide in a direction at right angles to the axis of rotation of the said carrier, the said control surface being profiled to produce such a bodily movement of the cam-blank that a required cam is generated.

12. In a machine for generating a cam of the worm-type, in combination with a tool, a rotatable cam-blank carrier located adjacent to the tool, a cam-generation control member operatively engaging the carrier, a guide for the said control member carried upon a fixed part of the machine, and means for moving the control member in the guide transversely of the axis of rotation of the carrier, the said control member being adapted when moved transversely for moving the said carrier axially past the tool, and means for moving the carrier more towards the tool at the ends of its axial travel than at the middle thereof.

13. In a machine for generating a cam of the worm-type, in combination with a tool, a cam-blank carrier and means for rotating the carrier and for moving it bodily past the tool to generate a cam-groove, means to withdraw the tool from the cam-groove at an end thereof consisting of spring means for acting on the tool, a member to hold up the action of the spring means, and trip means, operated in conjunction with the movement of the carrier, to release the spring means.

14. In a machine for generating a cam of the worm-type, in combination with a tool, a tool-carrier, a cam-blank carrier, a slide in which the cam-blank carrier is mounted, means for rotating the cam-blank carrier and means to move the slide bodily to carry the cam blank past the tool for the generation of a cam-groove in the said blank, means to withdraw the tool from the cam-groove at an end thereof consisting of spring means for acting on the tool, a member to hold up the action of the spring means, a pin mounted on the tool carrier, a trip-plate having a hole for receiving the said pin, a projection on the trip-plate, a spring acting in one direction on the projection, a lever of which one end is arranged for acting in the other direction on the said projection, and a part connected to the slide and arranged for engaging the other end of the lever towards one end of the bodily movement of the said slide.

15. In a machine for generating a cam of the worm-type, in combination with a cam-blank carrier and means for rotating the said carrier and moving it substantially in the direction of its axis of rotation, a cutting tool, a shaft carrying the tool at one end, and an angularly adjustable mounting for the shaft whereby the latter can be adjusted about an axis in the plane of the cutting tool.

16. In a machine for generating a cam of the worm-type, in combination with a cam-blank carrier and means for rotating the said carrier and moving it substantially in the direction of its axis of rotation, a cutting tool, a shaft carrying the tool at one end, a driving shaft operatively connected with the first-named shaft and having its axis aligned with a diameter of the cutting tool, a housing for the said driving shaft, a plate adjustable upon the housing angularly about the said axis and diameter and carrying the first named shaft, and means for securing the plate in its adjusted position upon the housing.

17. In a machine for generating a cam of the worm type, in combination with a slide, a carrier member rotatable thereon for receiving cam blanks, a cam generation control member operative upon the slide to move the same, a rack on the control member, a pinion meshing with the rack and operatively connected to one of the said members, the other of the said members being driven from the said one member through the rack and pinion.

18. In a machine for generating a cam of the worm type, in combination with a carrier for a cam-blank, means to control the generation of the cam comprising a control surface operative upon the carrier to move it bodily past the tool in two directions at right angles to one another, and guide means for said carrier adapted for endowing the bodily movement thereof with a third component in a direction substantially at right angles to the other movements.

19. In a machine for generating a cam of the worm type by a tool, in combination with a slide, a cam blank carrier rotatably mounted in the slide with its axis vertical, a cam-generation control member upon which the slide rests, means for moving the said control member to impart to the slide and carrier a vertical component of movement past the tool and a horizontal component of movement across the tool, and guiding means for the said slide adapted for imparting to it and the carrier a further component of movement away from the tool as the middle of the vertical component is approached and towards the tool as the ends of the said component are approached.

REGINALD BISHOP.